(12) United States Patent
Namkoong et al.

(10) Patent No.: US 8,136,550 B2
(45) Date of Patent: Mar. 20, 2012

(54) ELASTIC VALVE AND MICROFLUIDIC DEVICE INCLUDING THE SAME

(75) Inventors: Kak Namkoong, Seoul (KR); Chin-sung Park, Yongin-si (KR); Jin-tae Kim, Hwaseong-si (KR); Joo-won Rhee, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1085 days.

(21) Appl. No.: 12/023,197

(22) Filed: Jan. 31, 2008

(65) Prior Publication Data
US 2009/0057599 A1    Mar. 5, 2009

(30) Foreign Application Priority Data
Aug. 28, 2007    (KR) .................. 10-2007-0086547

(51) Int. Cl.
*E03B 1/00* (2006.01)
(52) U.S. Cl. .................. 137/601.04; 251/61.1
(58) Field of Classification Search .......... 137/625.28–625.33, 601.03, 601.04; 251/4, 7, 8, 61.1, 356; 422/100, 145
See application file for complete search history.

(56) References Cited

U.S. PATENT DOCUMENTS

| | | | | |
|---|---|---|---|---|
| 5,096,643 A * | 3/1992 | Kowanz et al. | | 264/130 |
| 7,201,881 B2 * | 4/2007 | Cox et al. | | 422/504 |
| 7,854,897 B2 * | 12/2010 | Tanaami et al. | | 422/505 |
| 2002/0029814 A1 * | 3/2002 | Unger et al. | | 137/824 |
| 2007/0012891 A1 * | 1/2007 | Maltezos et al. | | 251/12 |
| 2007/0041878 A1 * | 2/2007 | Bryning et al. | | 422/103 |

* cited by examiner

*Primary Examiner* — Stephen M Hepperle
*Assistant Examiner* — Jessica Cahill
(74) *Attorney, Agent, or Firm* — Sughrue Mion, PLLC

(57) ABSTRACT

An elastic valve and a microfluidic device including the same are provided. The elastic valve includes a channel dented by external pressure so as to be elastically restituted; and a plurality of channel closing protrusions, which comprise elastomer as a material, which are protruded from at least one inner side surface of the channel toward an opposite inner side surface, and which are separated from each other so as not to interrupt a flow of fluids, wherein, when external pressure is applied in order to dent the channel, the plurality of channel closing protrusions are deformed so as to be elastically restituted, thereby closing the channel.

20 Claims, 7 Drawing Sheets

ELASTIC VALVE AND MICROFLUIDIC DEVICE INCLUDING THE SAME

CROSS-REFERENCE TO RELATED PATENT APPLICATION

This application claims the benefit of Korean Patent Application No. 10-2007-0086547, filed on Aug. 28, 2007, in the Korean Intellectual Property Office, the disclosure of which is incorporated herein in its entirety by reference.

BACKGROUND OF THE INVENTION

1. Field of the Invention

The present invention relates to microfluidics, and more particularly, to an elastic valve controlling a flow of fluids flowing along a channel, and a microfluidic device including the elastic valve.

2. Description of the Related Art

In a field related to microfluidics, research into a microfluidic device capable of performing various functions such as performing biochemical reactions, detecting a result of the reactions, etc. by using biochemical fluids such as blood, urine, etc. has been actively carried out. The microfluidic device may include a device in the form of a chip known as a lab-on-a-chip, or a device in the form of a rotating disk known as a lab-on-a-disk. In the microfluidic device, a microchannel for transferring fluids is formed, and a microfluidic control valve unit for controlling a flow of the fluids flowing along the microchannel may be formed.

FIGS. 1A and 1B are cross-sectional views illustrating a cross-section of a conventional microfluidic device 10 disclosed in Korean Patent Laid-Open Application No. 2006-0038879, wherein FIG. 1A illustrates a case in which external pressure is not applied, and FIG. 1B illustrates a case in which deformation occurs due to applied external pressure.

Referring to FIG. 1A, the conventional microfluidic device 10 includes a lower-plate 11 formed of silicon Si, an upper-plate 13 formed of elastomer and attached to the lower-plate 11, and a channel 15 formed by a groove engraved on a bottom side of the upper-plate 13. The channel 15 is dented by external pressure, so as to be elastically restituted, from a direction indicated by an arrow illustrated in FIG. 1B.

However, if a cross-section of the channel 15 is rectangular-shaped as illustrated in FIG. 1A, although the channel 15 is dented by applied external pressure, the channel 15 is not completely closed but a space 16 as illustrated in FIG. 1B is often formed, thereby lessening the reliability of a closing of the channel 15.

SUMMARY OF THE INVENTION

The present invention provides an elastic valve capable of reliably closing a channel, regardless of the shape of a cross-section of the channel, and a microfluidic device including the elastic valve.

According to an aspect of the present invention, there is provided an elastic valve including a channel dented by external pressure so as to be elastically restituted; and a plurality of channel closing protrusions, which comprise elastomer as a material, are protruded from at least one inner side surface of the channel toward an opposite inner side, and are separated from each other so as not to interrupt a flow of fluids, wherein, when external pressure is applied thereby denting the channel, the plurality of channel closing protrusions are deformed so as to be elastically restituted, thereby closing the channel According to another aspect of the present invention, there is provided a microfluidic device including an upper-plate; a lower-plate adhered to the upper-plate; a channel which is formed by a groove engraved at least on a bottom surface of the upper-plate from among the bottom surface of the upper-plate and a top surface of the lower-plate, which are adhered to each other, and dented so as to be elastically restituted by external pressure; and a plurality of channel closing protrusions, which comprise elastomer as a material, which are protruded from at least one inner side surface of the channel toward an opposite inner side surface, and which are separated from each other so as not to interrupt a flow of fluids, wherein, when external pressure is applied, thereby denting the channel, the plurality of channel closing protrusions are deformed so as to be elastically restituted, thereby closing the channel.

The plurality of channel closing protrusions may protrude from the groove engraved on the bottom surface of the upper-plate toward the top surface of the lower-plate.

The upper-plate and the channel closing protrusions may be integrally formed of the same material.

The deformation of the channel closing protrusions may include expansion of a cross-section of the channel closing protrusions or flexure of the channel closing protrusions.

The elastomer may be polydimethylsiloxane (PDMS).

When the external pressure is not applied, an interval between each of the neighboring channel closing protrusions may be shorter than a length of the channel closing protrusions, wherein the length is a length of the channel closing protrusion in direction of width of the channel.

An end of each of the channel closing protrusions may be separated from the opposite inner side surface of the channel when the external pressure is not applied, but the end of each of the channel closing protrusions may be closely adhered to the opposite inner side surface of the channel when the external pressure is applied.

The external pressure may be exerted from the upper-plate toward the lower-plate, and the lower-plate may have a modulus of elasticity greater than that of the channel closing protrusions.

The lower-plate may be formed of silicon.

A shape of a cross-section of the channel closing protrusions may include a circle, an oval, a polygon, a circular arc, and a V-shaped form.

When a shape of a cross-section of the channel closing protrusions is a square, and a ratio of a height of the channel closing protrusions to a length of one side of the square is defined as an aspect ratio, the aspect ratio may be greater than 4.

The microfluidic device may further include a chamber which is connected to the channel and is capable of receiving fluids.

BRIEF DESCRIPTION OF THE DRAWINGS

The above and other features and advantages of the present invention will become more apparent by describing in detail exemplary embodiments thereof with reference to the attached drawings in which:

FIGS. 1A and 1B are cross-sectional views illustrating a cross-section of a channel of a conventional microfluidic device, wherein FIG. 1A illustrates a case in which external pressure is not applied, and FIG. 1B illustrates a case in which deformation occurs due to applied external pressure;

DETAILED DESCRIPTION OF THE INVENTION

An elastic valve and a microfluidic device including the same according to the present invention will now be described more fully with reference to the accompanying drawings, in which exemplary embodiments of the invention are shown.

Figure 1A:
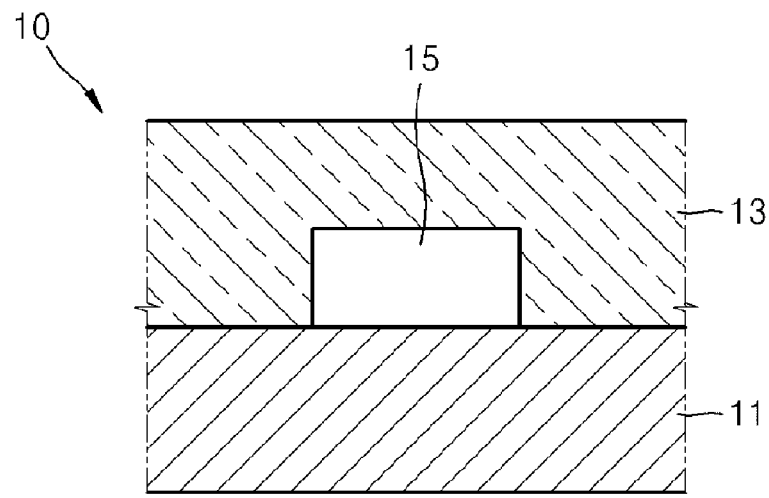
Figure 1B:
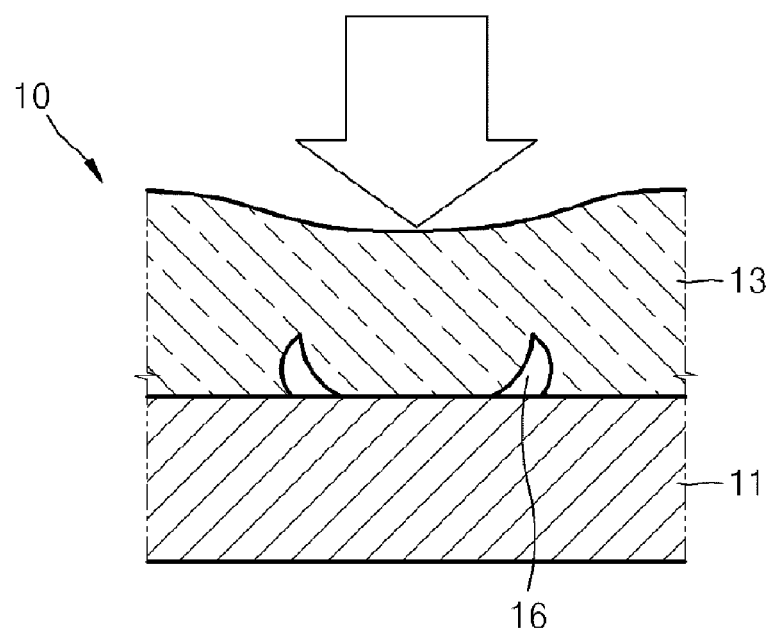
Figure 2:
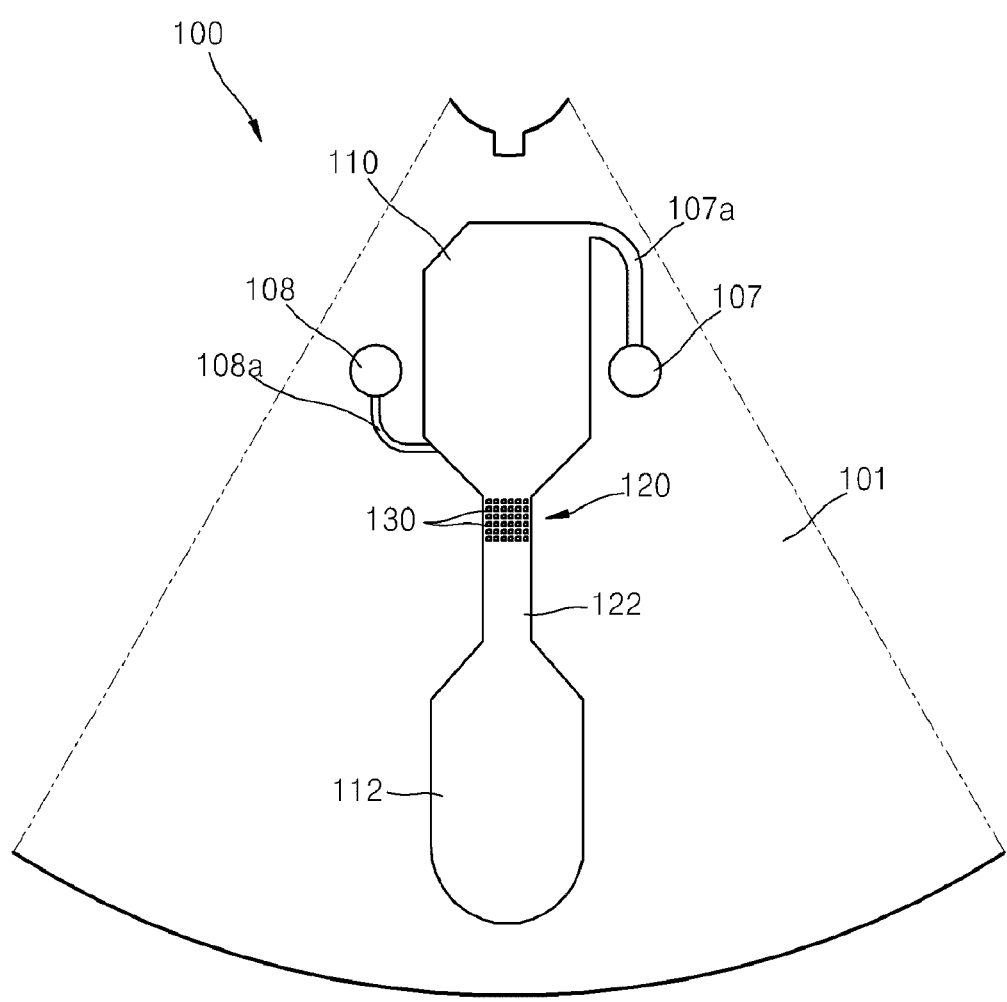
FIG. 2 is a plan view of a microfluidic device according to an embodiment of the present invention.
Figure 3:
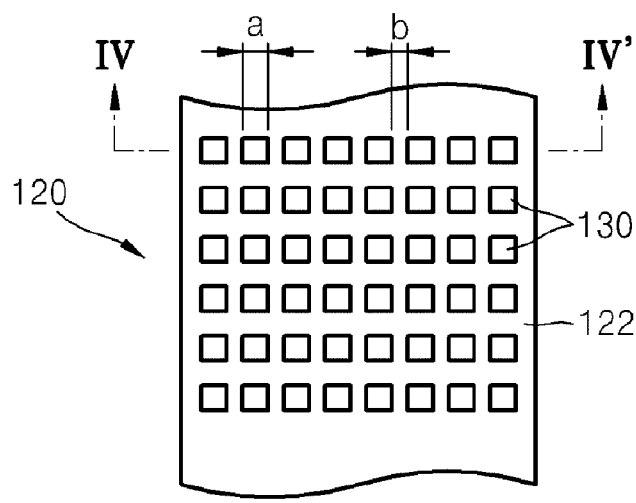
FIG. 3 is a magnified plan view of an elastic valve that is illustrated in FIG. 2, according to another embodiment of the present invention.
Figure 4:
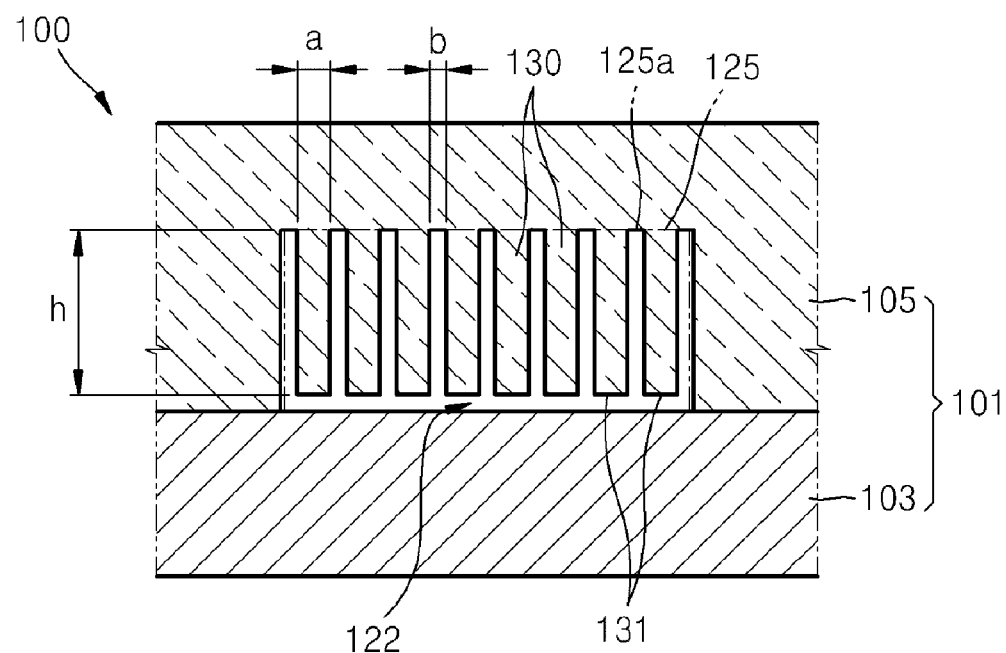
FIG. 4 is a vertical cross-sectional view that is cut along a line IV-IV' illustrated in FIG. 3.

FIG. 2 is a plan view of a microfluidic device 100 according to an embodiment of the present invention. FIG. 3 is a magnified plan view of an elastic valve 120 that is illustrated in FIG. 2, according to another embodiment of the present invention. FIG. 4 is a vertical cross-sectional view that is cut along a line IV-IV' illustrated in FIG. 3.

Referring to FIGS. 2 through 4, the microfluidic device 100 according to the present invention includes a platform 101 in the form of a disk comprised of an upper-plate 105 and a lower-plate 103, which are adhered to each other. The platform 101 includes therein structures for performing reactions using biochemical fluids (not shown), such as blood, urine, etc. To be more specific, the microfluidic device 100 is designed so as to perform a Polymerase Chain Reaction (PCR). The platform 101 includes an inlet hole 107 for injecting biochemical fluids, a fluid induction chamber 110 receiving the biochemical fluids injected into the inlet hole 107, a reaction chamber 112 to which the PCR of the biochemical fluids is induced and which is capable of detecting a result of the PCR by using a fluorescent method, a channel 122 connecting the fluid induction chamber 110 and the reaction chamber 112, and the elastic valve 120 for controlling a flow of biochemical fluids via the channel 122. Also, the microfluidic device 100 further includes an inlet channel 107a connecting the inlet hole 107 and the fluid induction chamber 110, a vent hole 108 by which fluids injected via the inlet hole 107 can easily flow to the fluid induction chamber 110, and a vent channel 108a connecting the vent hole 108 and the fluid induction chamber 110.

Operation of the microfluidic device 100 is based on centrifugal forces, that is, the platform 101 of the microfluidic device 100 is installed on a motor (not shown), thereby allowing the microfluidic device 100 to rotate. By rotating the platform 101, biochemical fluids injected via the inlet hole 107 and then received by the fluid induction chamber 110 are pressurized from the fluid induction chamber 110 toward the reaction chamber 112. In this manner, when the biochemical fluids are received in the reaction chamber 112, the channel 122 may be closed by using the elastic valve 120, the platform 101 may be periodically heated according to a program for a PCR, and thus the PCR of the biochemical fluids may be induced. Since the channel 122 is closed, evaporation of the chemical fluids received in the reaction chamber 112 is prevented during the PCR. By doing so, it may be possible to achieve a stable PCR in the reaction chamber 112, and the reliability of a result of a reaction analysis may also be increased.

Meanwhile, it is possible to detect and analyze fluorescent signals emitted from chemical fluids received in the reaction chamber 112, thereby analyzing a PCR using the microfluidic device 100. Such a method of detecting a fluorescent signal and thereby analyzing chemical reactions is defined as fluorescence detection. In fluorescence detection used to analyze a PCR, various methods have been developed, such as a method of using dyes, e.g., SYBR Green I which emits fluorescence when bound with double-stranded deoxyribonucleic acid (DNA) created from a PCR, a method of setting a DNA sequence as a probe and using a phenomenon in which fluorescence is emitted when a connection between a fluorophore and a quencher in both ends of the probe is broken, and the like. The fluorescence detection related to the PCR is well-known to one of ordinary skill in the art, and thus, a detailed description thereof will be omitted here.

The inlet hole 107 and the vent hole 108 are formed by an aperture in the upper-plate 105. The channel 122, the inlet channel 107a, and the vent channel 108a are formed by a groove engraved at least on a bottom surface of the upper-plate 105 from among a top surface of the lower-plate 103 and the bottom surface of the upper-plate 105 which are mutually adhered while facing each other. The fluid induction chamber 110 and the reaction chamber 112 are formed by a groove engraved on the top surface of the lower-plate 103, or the bottom surface of the upper-plate 105.

The upper-plate 105 may be manufactured by pouring a mixture formed of a resin of elastomer and a hardener into an upper-plate mold (not shown), hardening the mixture, and then separating the mixture from the upper-plate mold. As an example of the elastomer, polydimethylsiloxane (PDMS) may be used. To be more specific, Sylgard® 184 of Dow Corning Corporation is an example of a mixture formed of elastomer and resin.

In the current embodiment, the lower-plate 103 is formed of silicon Si that has a high characteristic in transferring heat and is a rigid material. However, the lower-plate 103 according to the present invention is not limited thereto but may also be formed of a plastic material that is relatively inexpensive. At least one of the upper-plate 105 and the lower-plate 103 may be activated by oxygen plasma treatment, and then the upper-plate 105 and the lower-plate 103 may be adhered to each other. Otherwise, the upper-plate 105 and the lower-plate 103 may be adhered to each other by using double-sided adhesive tapes.

The elastic valve 120 includes a plurality of channel closing protrusions 130 which are protruded from at least one inner side of the channel 122 toward an opposite inner side. To be more specific, since the channel closing protrusions 130 are integrally formed with the upper-plate 105 when the upper-plate 105 is manufactured by a molding method, similar to that used to manufacture the upper-plate 105, the channel closing protrusions 130 include elastomer as a material. The channel closing protrusions 130 are protruded from an inner side surface 125a of a groove 125 engraved on the upper-plate 105 toward a top surface of the opposite lower-plate 103. The channel closing protrusions 130 do not have to be integrally formed with the upper-plate 105 but may be adhered to the inner side surface 125a of the groove 125 of the upper-plate 105.

As illustrated in FIG. 3, when external pressure is not applied to the channel 122, a cross-section of the channel closing protrusions 130 is square-shaped, and an interval b between the neighboring channel closing protrusions 130 is formed whereby biochemical fluids may flow via the channel 122. Also, as illustrated in FIG. 4, when external pressure is not applied to the channel 122, a length h of the channel closing protrusions 130 may be set whereby an end 131 of the channel closing protrusions 130 is to be slightly separated from the top surface of the opposite lower-plate 103.

Figure 5A:
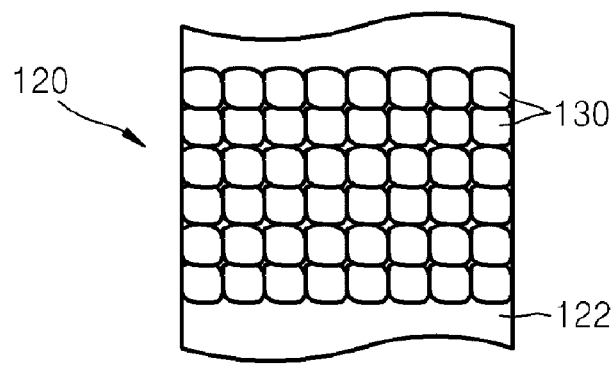
FIGS. 5A and 5B are respectively a horizontal cross-sectional view and a vertical cross-sectional view which are of channel closing protrusions deformed when external pressure is applied to an elastic valve, according to another embodiment of the present invention.
Figure 5B:
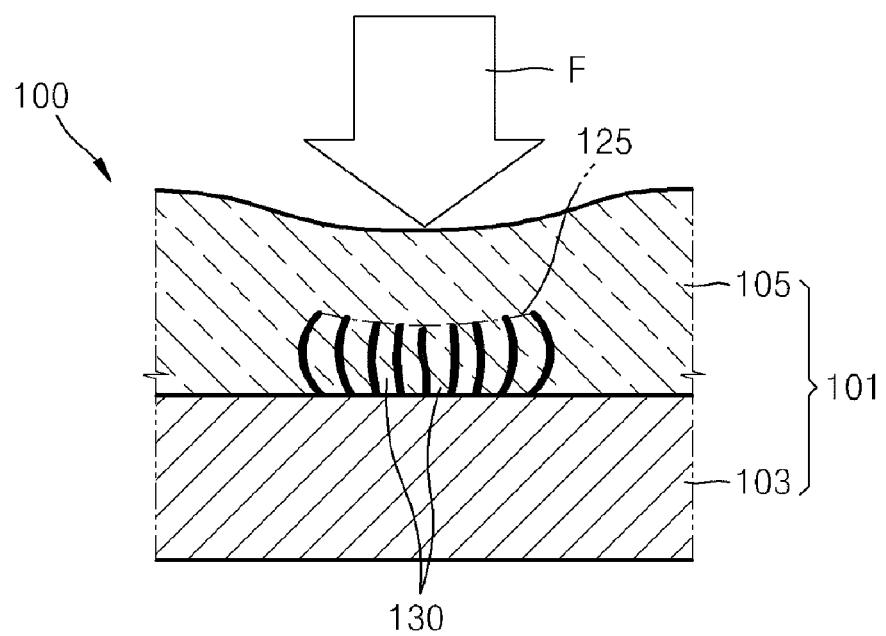

FIGS. 5A and 5B are respectively a horizontal cross-sectional view and a vertical cross-sectional view, which are of the channel closing protrusions 130 deformed when external pressure F is applied to the elastic valve 120. Referring to FIGS. 5A and 5B, when the upper-plate 105 is pressurized toward the lower-plate 103 by application of the external pressure F, the groove 125 formed in the upper-plate 105 is dented so as to be elastically restituted toward the lower-plate 103, and this dent causes the channel 122 to be dented. Then, the end 131 of the channel closing protrusions 130 as illustrated in FIG. 4 is closely adhered to the top side of the opposite lower-plate 103, thereby being deformed so as to be elastically restituted. The deformation of the channel closing protrusions 130 includes expansion of a cross-section of the channel closing protrusions 130 as seen by comparing FIG. 3 with FIG. 5A, and flexure of the channel closing protrusions 130 as seen by comparing FIG. 4 with FIG. 5B. When the external pressure F increases, the deformation of the channel closing protrusions 130 grows severe, and causes the channel 122 to be closed whereby fluids cannot flow as illustrated in FIG. 5B. When the external pressure F is removed, the upper-plate 105 is elastically restituted, and thus, the channel 122 is re-opened.

The external pressure F that is to be applied to the upper-plate 105 may be controlled by a tester by manually pressing the upper-plate 105 that overlaps the channel closing protrusions 130. However, the external pressure F may be automatically controlled by a clamp (not shown) that is programmed therein so as to partly pressurize the upper-plate 105 by applying an appropriate pressure.

In the case where the lower-plate 103 is formed of silicon Si that is a rigid material, when the external pressure F is applied, the channel closing protrusions 130 may be greatly deformed, and thus, the reliability of a closing of the channel 122 may be increased. Although the lower-plate 103 is not a rigid material, if the modulus of elasticity of the lower-plate 103 is greater than those of the channel closing protrusions 130 and upper-plate 105, the channel closing protrusions 130 may be capable of being pressed and greatly deformed, and thus, it is possible to reliably close the channel 122.

If uniform external pressure F is applied, and there is no difference in terms of the materials forming the channel closing protrusions 130 and upper-plate 105, the reliability of a closing of the channel 122 relates to the shape of the channel closing protrusions 130. To be more specific, as illustrated in FIG. 3, when external pressure F illustrated in FIG. 5B is not applied, the interval b between the neighboring channel closing protrusions 130 is shorter than a length a of the channel closing protrusions 130, wherein the length a is a length of the channel closing protrusions 130 in direction of width of the channel 122. As described above, since the cross-section of the channel closing protrusions 130 is square-shaped, the length a of the channel closing protrusions 130 is the same as a length of one side of the channel closing protrusions 130.

Meanwhile, as illustrated in FIG. 4, assuming that a ratio of the length a to a height h, that is h/a, is defined as an aspect ratio, the aspect ratio of the channel closing protrusions 130 is greater than 4, wherein the length a is a length of one side of the square-shaped cross-section of the channel closing protrusions 130, and the height h is a height of the channel closing protrusions 130.

Figure 6A:
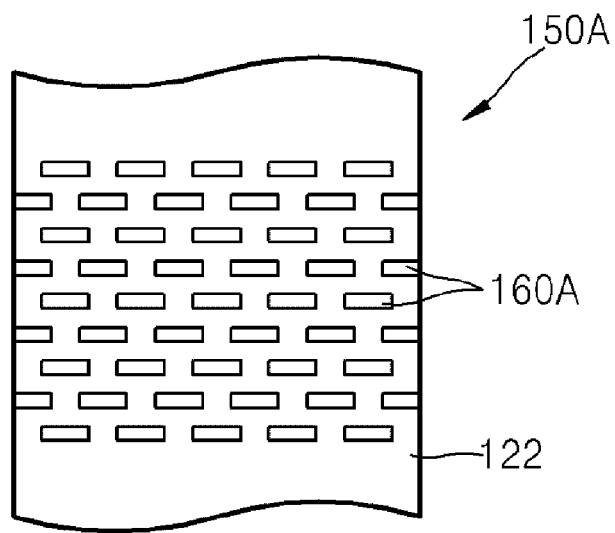
FIGS. 6A and 6E are magnified plan views of elastic valves, according to other embodiments of the present invention.
Figure 6B:
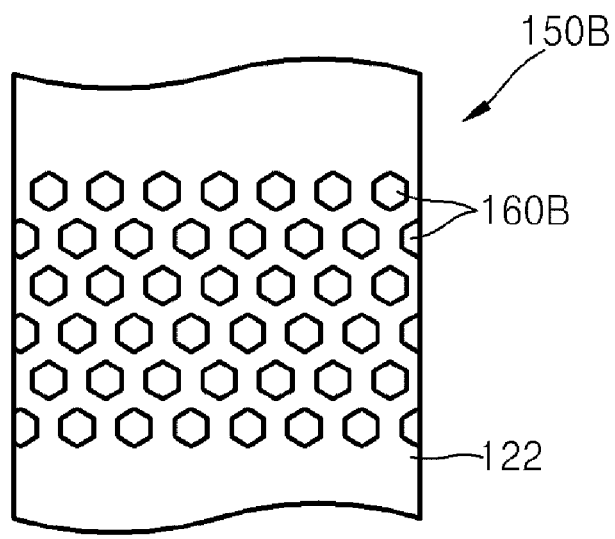
Figure 6C:
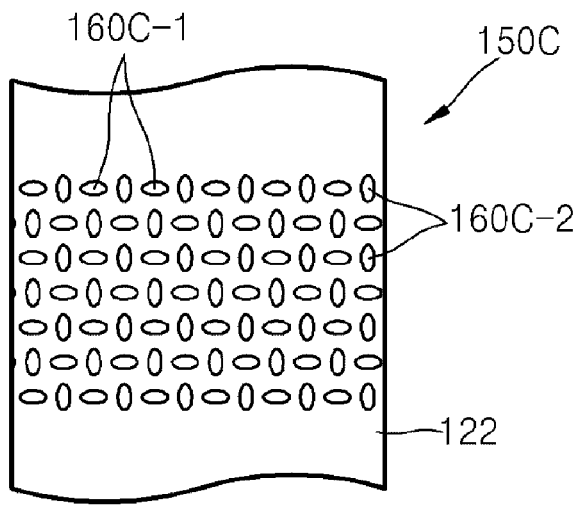
Figure 6D:
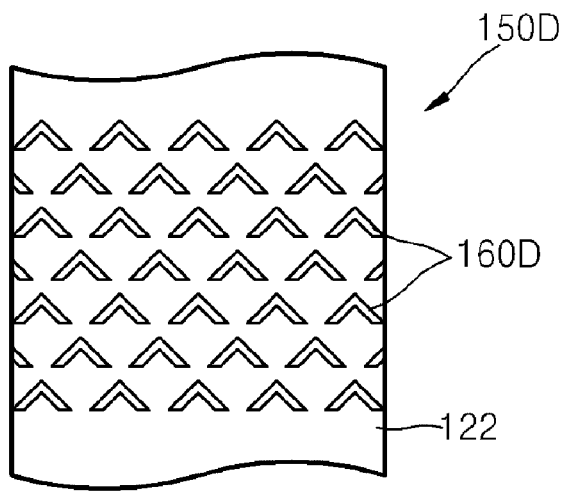
Figure 6E:
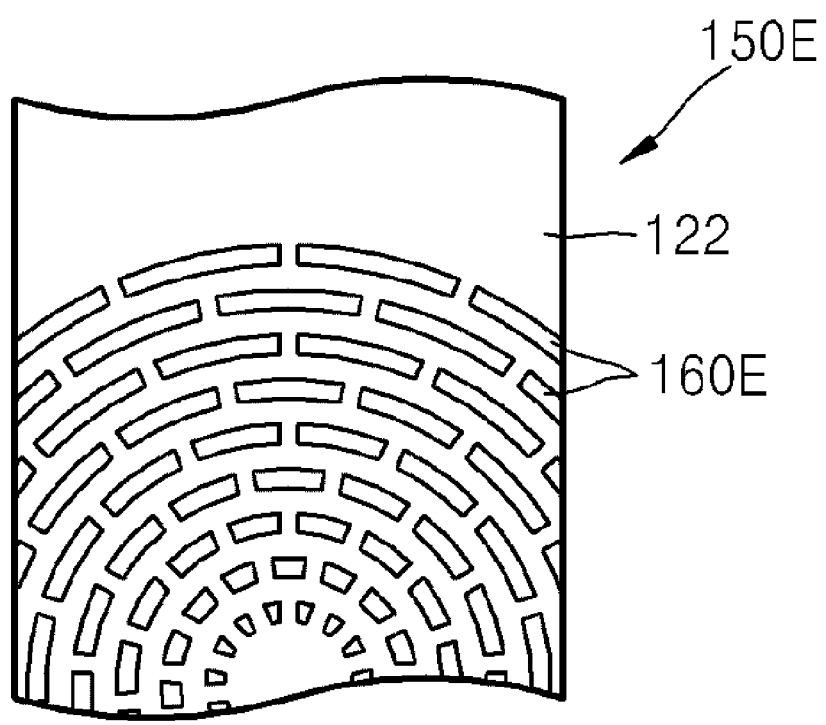

FIGS. 6A and 6E are magnified plan views of elastic valves 150A, 150B, 150C, 150D, and 150E, respectively, according to other embodiments of the present invention. FIGS. 6A and 6E illustrate examples capable of replacing the elastic valve 120 of the microfluidic device 100. Referring to FIGS. 6A and 6E, the elastic valves 150A, 150B, 150C, 150D, and 150E according to the current embodiment of the present invention include a channel 122 that is dented so as to be elastically restituted by external pressure, and a plurality of channel closing protrusions protrusively formed inside of the channel 122. To be more specific, the elastic valve 150A of FIG. 6A includes a plurality of channel closing protrusions 160A which have a rectangular-shaped cross-section and are separated from each other, and the elastic valve 150B of FIG. 6B includes a plurality of channel closing protrusions 160B which have a hexagonal-shaped cross-section and are separated from each other. On the other hand, in the elastic valve 150C of FIG. 6C, a first type channel closing protrusion 160C-1 that is positioned widthwise to the channel 122, and a second type channel closing protrusion 160C-2 that is positioned lengthwise to the channel 122 are separated from each other and alternately arranged inside of the channel 122.

Also, the elastic valve 150D of FIG. 6D includes a plurality of channel closing protrusions 160D which have a V-shaped cross-section and are separated from each other, and the elastic valve 150E of FIG. 6E includes a plurality of channel closing protrusions 160E which have a concentric rectangular-shaped cross-section and are separated from each other. However, the channel closing protrusion included in the elastic valve according to the present invention is not limited thereto and may also have a circle-shaped cross-section.

The present invention can close the channel so as to be elastically restituted, although external pressure denting the channel is not excessively large. Therefore, the reliability of a closing of the channel is increased.

Also, regardless of the shape of a channel cross-section, it is possible to reliably close the channel due to deformation of the channel closing protrusion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An elastic valve comprising:
   a channel dented by external pressure so as to be elastically restituted; and
   a plurality of channel closing protrusions, which comprise elastomer as a material, are protruded from at least one inner side surface of the channel toward an opposite inner side, and are separated from each other by an interval so as not to interrupt a flow of fluids,
   wherein, when external pressure is applied thereby denting the channel, the plurality of channel closing protrusions are deformed so as to be elastically restituted, thereby closing the channel, and
   wherein the deformation of the channel closing protrusions comprises expansion of a cross-section of the channel closing protrusions sideways towards one another so that adjacent channel closing protrusions touch each other to close the corresponding interval to thereby completely close the channel.

2. The elastic valve of claim 1, wherein the deformation of the channel closing protrusions comprises flexure of the channel closing protrusions.

3. The elastic valve of claim 1, wherein the elastomer is polydimethylsiloxane (PDMS).

4. The elastic valve of claim 1, wherein, when the external pressure is not applied, the interval between each of the neighboring channel closing protrusions is shorter than a length of the channel closing protrusions, wherein the length is a length of the channel closing protrusion in direction of width of the channel.

5. The elastic valve of claim 1, wherein an end of each of the channel closing protrusions is separated from the opposite inner side surface of the channel when the external pressure is not applied, but the end of each of the channel closing protrusions is closely adhered to the opposite inner side surface of the channel when the external pressure is applied.

6. The elastic valve of claim 1, wherein the inner side surface of the channel, which is opposite to an end of each of the channel closing protrusions, has a modulus of elasticity greater than that of the channel closing protrusions.

7. The elastic valve of claim 1, wherein a shape of a cross-section of each of the channel closing protrusions comprises one of an oval, a circular arc, and a V-shaped form.

8. The elastic valve of claim 1, wherein, when a shape of a cross-section of each of the channel closing protrusions is a square, and a ratio of a height of the channel closing protrusions to a length of one side of the square is defined as an aspect ratio, the aspect ratio being greater than 4.

9. A microfluidic device comprising:
an upper-plate;
a lower-plate adhered to the upper-plate;
a channel which is formed by a groove engraved at least on a bottom surface of the upper-plate from among the bottom surface of the upper-plate and a top surface of the lower-plate, which are adhered to each other, and dented so as to be elastically restituted by external pressure; and
a plurality of channel closing protrusions, which comprise elastomer as a material, which are protruded from at least one inner side surface of the channel toward an opposite inner side surface, and which are separated from each other by an interval so as not to interrupt a flow of fluids,
wherein, when external pressure is applied, thereby denting the channel, the plurality of channel closing protrusions are deformed so as to be elastically restituted, thereby closing the channel, and
wherein the deformation of the channel closing protrusions comprises expansion of a cross-section of the channel closing protrusions sideways towards one another so that adjacent channel closing protrusions touch each other to close the corresponding interval to thereby completely close the channel.

10. The microfluidic device of claim 9, wherein the plurality of channel closing protrusions protrude from the groove engraved on the bottom surface of the upper-plate toward the top surface of the lower-plate.

11. The microfluidic device of claim 10, wherein the upper-plate and the channel closing protrusions are integrally formed of the same material.

12. The microfluidic device of claim 9, wherein the deformation of the channel closing protrusions comprises flexure of the channel closing protrusions.

13. The microfluidic device of claim 9, wherein the elastomer is polydimethylsiloxane (PDMS).

14. The microfluidic device of claim 9, wherein, when the external pressure is not applied, the interval between each of the neighboring channel closing protrusions is shorter than a length of the channel closing protrusions, wherein the length is a length of the channel closing protrusion in direction of width of the channel.

15. The microfluidic device of claim 9, wherein an end of each of the channel closing protrusions is separated from the opposite inner side surface of the channel when the external pressure is not applied, but the end of each of the channel closing protrusions is closely adhered to the opposite inner side surface of the channel when the external pressure is applied.

16. The microfluidic device of claim 9, wherein the external pressure is exerted from the upper-plate toward the lower-plate, and the lower-plate has a modulus of elasticity greater than that of the channel closing protrusions.

17. The microfluidic device of claim 16, wherein the lower-plate is formed of silicon.

18. The microfluidic device of claim 9, wherein a shape of a cross-section of the channel closing protrusions comprises one of an oval, a circular arc, and a V-shaped form.

19. The microfluidic device of claim 9, wherein, when a shape of a cross-section of the channel closing protrusions is a square, and a ratio of a height of the channel closing protrusions to a length of one side of the square is defined as an aspect ratio, the aspect ratio being greater than 4.

20. The microfluidic device of claim 9, further comprising a chamber which is connected to the channel and is capable of receiving fluids.

* * * * *